Patented Nov. 30, 1937

2,100,822

UNITED STATES PATENT OFFICE 2,100,822

CONTINUOUS PROCESS FOR PRODUCTION OF ARALKYL HALIDES

Harold M. Spurlin, Wilmington, Del., assignor to Hercules Powder Company, Wilmington, Del., a corporation of Delaware No Drawing. Application August 21, 1935, Serial No. 37,174

17 Claims. (Cl. 260—160)

This invention relates to the production of aralkyl halides, and more particularly to their production from di-aralkyl ethers. One embodiment of this invention is directed to the production of aralkyl halides from crude mixtures containing aralkyl ethers, such as the crude mixtures which are recovered in the production of aralkyl ethers of cellulose.

In the production of aralkyl ethers of cellulose, as for example, benzyl cellulose, phenylethyl cellulose, etc., alkali cellulose is treated with an aralkyl halide, as benzyl chloride, phenylethyl chloride, the corresponding bromides or iodides, etc. In addition to the aralkyl ether of cellulose, which is the desired reaction product, there are formed various by-products, principally the aralkyl alcohol and the di-aralkyl ether corresponding to the halide employed.

These by-products are of little commercial value, and it is customary to treat the crude reaction mixture, after the separation of the ether of cellulose, so as to produce therefrom aralkyl halides which can be used once more in the production of the cellulose ether. Thus, for example, U. S. Patent No. 1,872,227 to Bennett et al., discloses a method of treating the crude reaction mixture resulting from the benzylation of cellulose with hydrogen chloride to convert the benzyl alcohol present to benzyl chloride. This treatment, however, has no effect upon the di-benzyl ether present in the mixture, and the same patentees in U. S. Patent No. 1,911,667 disclose chlorination of the residue left after treatment in accordance with their earlier patent in order to break down the dibenzyl ether. By such treatment only one molecule of benzyl chloride is formed for each molecule of di-benzyl ether, with a loss of one half the potential yield of benzyl chloride.

In an application Serial No. 11,830, filed March 19, 1935 in the name of Lloyd H. Fisher, a procedure is disclosed in accordance with which a di-aralkyl ether, as, for example, dibenzyl ether, di-phenylethyl ether, etc. may be converted into the corresponding aralkyl halide by treatment with a hydrogen halide, as, for example, hydrogen chloride, hydrogen bromide, hydrogen iodide, etc., in the presence of a catalyst, such as, for example, a heavy metal halide as zinc chloride, antimony trichloride, stannous chloride, ferric chloride, their bromides and iodides, etc. The procedure there described produces aralkyl halides in yields of only about 65% of the theoretical.

The relatively low yield obtained by the method disclosed by Fisher is due to the resinification of the aralkyl halide formed, induced by contact with the catalyst employed. The resinous material so formed is of no commercial value and is hence a total loss. I have discovered, however, that this loss of the aralkyl halide by resinification can be almost completely avoided and yields as high as 98% of theoretical obtained by removing the aralkyl halide from the reaction zone as rapidly as formed, while controlling the reaction so that the rate of reaction is high.

This invention is, then, directed to an improved process for the production of aralkyl halides from di-aralkyl ethers. The method in accordance with this invention comprises the treatment of a di-aralkyl ether, either alone or in admixture with other materials, and specifically the crude mixture obtained by the aralkylation of cellulose, with a hydrogen halide and a catalyst, as, for example, a heavy metal halide, under conditions of concentration, temperature, etc., suitable for effecting the rapid reaction of the di-aralkyl ether and the hydrogen halide, followed by the continuous removal of the aralkyl halide from the reaction as formed.

Each of the various factors involved in the reaction has an effect on the reaction rate and the yield. The essence of the method in accordance with this invention, however, is the removal of the aralkyl halide from the reaction zone as rapidly as formed. This may be done by continuously passing the materials, di-aralkyl ether, hydrogen halide, catalyst and water through a zone in which the conditions of temperature, pressure, etc. are suitable for the reaction to take place; or alternately by passing a mixture of di-aralkyl ether and aqueous hydrochloric acid continuously or intermittently into a reaction vessel containing an aqueous solution of the catalyst and continuously removing the aralkyl halide. The latter method gives the higher yields of the two, due to the fact that the reaction mixture remains continuously in the reaction zone, with the continuous removal of the aralkyl halide forcing the reaction to completion in the direction of the formation of aralkyl halide. Thus, the removal of the aralkyl halide from the reaction mixture while in the reaction zone, not only avoids loss of yield by resinification, but also increases the yield by forcing substantially complete conversion of the di-aralkyl ether to aralkyl halide.

The reaction will desirably be carried out at an elevated temperature, for example, from about 80° C. to about 120° C. in order to obtain a practical reaction rate. The reaction rate increases with the temperature, but there is a practical limitation on the temperature which can be used, due to the decomposition of the aralkyl halides at the more elevated temperatures. I have found that, in general, it is undesirable to use reaction temperatures above 120° C.

The reaction will preferably be carried out under atmospheric pressure for convenience, although pressures above or below atmospheric pressure may be used if desired. The catalyst will preferably be a heavy metal halide, and desirably one stable in a hydrogen halide solution and somewhat soluble in the di-aralkyl ethers, as, for example, zinc chloride, ferric chloride, antimony chloride, etc., their bromides or their iodides.

The concentrations of the various components of the reaction mixture also influence the yield of aralkyl halide. Increasing concentrations of the products of the reaction tend to reduce the reaction rate by lowering the concentration of the reactants. It is then desirable to keep the concentration of aralkyl halide at a minimum and the concentration of di-aralkyl ether and the hydrogen halide at a maximum. The efficient removal of the aralkyl halide, as, for example, by distillation, is essential to keep the rate of reaction high, as well as to avoid its resinification. It should be removed as rapidly as possible and should preferably not be allowed to reach a concentration of more than about 20% of the oily phase of the heterogeneous reaction mixture.

Water is also a product of the reaction, but its concentration affects the rate of reaction by affecting the reactivity of the catalyst, as well as by diluting the reactants. As the water content of the catalyst solution increases, the rate of reaction increases, at any temperature below the melting point of the catalyst, until all the catalyst is in solution, and then falls off. The rate of reaction is, then, a maximum, at the minimum concentration necessary to keep the catalyst in solution in the aqueous and organic phases at the reaction temperature. However, the rapid resinification of the aralkyl halide produced, with the more concentrated solutions of catalyst, makes it desirable to keep the concentration of catalyst in the aqueous phase, at or below 25%. It is desirable to keep this concentration at approximately 25%, since the rate of reaction falls off as it is lowered.

The hydrogen halide may be used in the gaseous phase or may be used in aqueous solution, the latter procedure usually being more convenient. With an aqueous solution of the hydrogen halide, it is desirable to use a relatively concentrated solution, say of a concentration within the range of about 10% to 50%, to avoid undue dilution of the reactants and the catalyst solution. The ratio of HCl to water on the aqueous phase will desirably be within the range of about 1:1 to about 1:7. The hydrogen halide and di-aralkyl ether will desirably be used in chemically equivalent quantities, although an excess of one or the other may be used.

The quantity of catalyst used in the reaction will be determined by the amount of di-aralkyl ether and the amount of water present in the reaction mixture. A ratio of catalyst to water in the aqueous phase within the range of about 1:1 to about 1:10 will, in general, be satisfactory.

Di-aralkyl ethers are ordinarily immiscible with aqueous solution of hydrogen halide and catalysts, so that the reaction occurs in a heterogeneous mixture. In such cases it is desirable to provide efficient agitation during the reaction and to keep both the di-aralkyl ether phase and the aqueous phase present in sufficient amount to secure intimate contact. I have found that approximately equal volumes of the two phases are convenient to use.

Benzyl chloride, for an example, condenses with itself quite rapidly at temperatures much above 100° C., with evolution of HCl and seeming benzyl substitution in the ring of another benzyl compound, in the manner of the Friedel-Crafts reaction. This reaction is catalyzed by $FeCl_3$, $SbCl_3$ and $ZnCl_2$, the catalysts used. Now, I have found that increasing water content hinders the condensation more than it decreases the rate of ether splitting. With benzyl ether, it is accordingly desirable to keep the catalyst concentration in the aqueous phase below 25%, and to remove the benzyl chloride as fast as formed, as a constant boiling mixture with water and HCl. This is easily feasible because of the high boiling point of benzyl ether. The water formed by the reaction is removed at the same time, and because of the large excess of water circulating in the system it is possible to utilize a rather dilute aqueous HCl solution (as low as 25% HCl) for the reaction.

To avoid resinification it is desirable to maintain the concentration of aralkyl halide in the reaction mixture as low as possible. However, since the amount of di-aralkyl ether which distills over is proportionate to the ratio of the relative amounts of di-aralkyl ether and aralkyl halide present in the reaction mixture, it is not advisable to permit the concentration of aralkyl halide to fall too low. In practice, as high a concentration of aralkyl halide will be maintained as is consistent with good yields.

The reaction in this instance occurs to a large extent in the non-aqueous phase, and its rate depends upon the amount of this phase, the concentration of hydrogen halide and catalyst in the aqueous phase, and the contact between the two phases. Vigorous agitation accordingly greatly increases the reaction rate and it is desirable to provide for such agitation by means of a mechanical stirrer, etc. The reaction temperature is determined by the boiling point of the reaction mixture, which in turn is determined by the factors referred to above and the pressure. For convenience, atmospheric pressure is preferable, but superatmospheric pressure may be employed.

A concentration of catalyst greater than 25% is difficult to use, as the aralkyl halide must then be distilled very rapidly to avoid resinification. It has been found desirable to keep the catalyst concentration in the water phase around 20%, and the hydrogen halide concentration in the feed above 25%. A range for the hydrogen halide concentration of 10–50% may be used, however.

The following procedures are illustrative of the method in accordance with this invention in practical form.

Where a di-aralkyl ether, as di-benzyl ether, is to be converted to an aralkyl halide, the ether, carrying a catalyst in solution therein, together with an excess of dry hydrogen halide, may be passed continuously through a long narrow glass tube, which is suitably heated. Thus, by passing a 1% solution of zinc chloride in dibenzyl ether, together with excess gaseous hydrochloric acid, through a coil 10 meters long and 4 millimeters in diameter, immersed in a bath at about 118° C., at a rate of 150 g. per hour, it is possible to obtain an 85% yield of benzyl chloride. About 10% of the starting material is lost as resins, and about 5% is unaccounted for. About 12% of the dibenzyl ether fails to react and is recovered.

A mixture of di-aralkyl ether, aqueous hydrogen halide solution, and catalyst may be maintained at such a temperature that the aralkyl halide formed is continuously removed by distillation. Water and hydrogen halide also distill over, and if no fractionating column is used, some di-aralkyl ether. The hydrogen halide lost by reaction and distillation is replaced by the addition of fresh, concentrated solution to the reaction mixture. Di-aralkyl ether is, of course, also added to replace that used in the reaction and lost by distillation.

The following example is illustrative of this procedure. A mixture of 499 grams of benzyl ether, 580 cc. of $ZnCl_2$ solution composed of 450 grams of $ZnCl_2$ and an equal weight of water, and 870 cc. of concentrated hydrochloric acid (sp. gr. 1.17) was placed in a two-liter glass vessel fitted with an outlet at the bottom, a rapidly revolving stirrer fitted with a mercury seal, and a condenser for distillation of the product. This mixture was heated with stirring and the aqueous layer of the distillate returned to the reaction vessel. A temperature rise from 109° C. to 113° C. indicated the end of the reaction when no further benzyl chloride was present. In the course of 2 hours 607 grams of crude benzyl chloride was obtained. On distillation, this product gave 585 grams of pure benzyl chloride and 19 grams of unreacted dibenzyl ether. This corresponded to a yield of approximately 96% of theoretical.

It will be understood that the details and examples hereinbefore set forth are illustrative only, and that the invention as broadly described and claimed is in no way limited thereby.

What I claim and desire to protect by Letters Patent is:

1. The method of producing an aralkyl halide which includes reacting a di-aralkyl ether with a hydrogen halide in the presence of an aqueous solution of a heavy metal halide at a temperature not in excess of about 120° C. and continuously removing aralkyl halide from the reaction as formed.

2. The method of producing an aralkyl halide which includes continuously passing a mixture of a di-aralkyl ether, hydrogen halide and an aqueous solution of a heavy metal halide through a reaction zone at a temperature not in excess of about 120° C., effecting reaction of the di-aralkyl ether and the hydrogen halide in the reaction zone, and removing aralkyl halide from the reaction zone as formed.

3. The method of producing an aralkyl halide which includes reacting a di-aralkyl ether with a hydrogen halide in the presence of an aqueous solution of a heavy metal halide at a temperature not in excess of about 120° C. while causing the aralkyl halide formed to be continuously volatilized from the reaction mixture.

4. The method of producing an aralkyl halide which includes reacting a di-aralkyl ether with a hydrogen halide in the presence of an aqueous solution of a heavy metal halide selected from the group consisting of zinc chloride, antimony trichloride, ferric chloride, zinc iodide, antimony tri-iodide, ferric iodide, zinc bromide, antimony tribromide, and ferric bromide at a temperature not in excess of about 120° C., and continuously removing aralkyl halide from the reaction as formed.

5. The method of producing an aralkyl halide which includes reacting a di-aralkyl ether with a hydrogen halide in the presence of an aqueous solution of a heavy metal halide at a temperature of from about 80° C. to 120° C. and continuously removing aralkyl halide from the reaction as formed.

6. The method of producing an aralkyl halide which includes reacting a di-aralkyl ether with an aqueous solution of a hydrogen halide in the presence of an aqueous solution of a heavy metal halide at a temperature not in excess of about 120° C. while causing the aralkyl halide formed to be continuously volatilized from the reaction mixture.

7. The method of producing an aralkyl halide which includes reacting a di-aralkyl ether with an aqueous solution of a hydrogen halide in the presence of a heavy metal halide selected from the group consisting of zinc chloride, antimony trichloride, ferric chloride, zinc iodide, antimony tri-iodide, and ferric iodide, zinc bromide, antimony tribromide, ferric bromide at a temperature not in excess of about 120° C., while causing the aralkyl halide formed to be continuously volatilized from the reaction mixture.

8. The method of producing an aralkyl halide which includes heating a di-aralkyl ether with an aqueous solution of a hydrogen halide in the presence of a heavy metal halide selected from the group consisting of zinc chloride, antimony trichloride, ferric chloride, zinc iodide, antimony tri-iodide, ferric iodide, zinc bromide, antimony tribromide, and ferric bromide at a temperature not in excess of about 120° C., and continuously during the reaction volatilizing aralkyl halide from the reaction mixture as formed.

9. The method of producing an aralkyl halide which includes reacting a di-aralkyl ether with a hydrogen halide in the presence of an aqueous solution of a heavy metal halide under superatmospheric pressure at a temperature of from about 80° C. to 120° C. and continuously removing aralkyl halide from the reaction as formed.

10. The method of producing an aralkyl halide which includes heating under superatmospheric pressure a di-aralkyl ether with an aqueous solution of a hydrogen halide in the presence of a heavy metal halide selected from the group consisting of zinc chloride, antimony trichloride, ferric chloride, zinc iodide, antimony tri-iodide, ferric iodide, zinc bromide, antimony tribromide, and ferric bromide at a temperature not in excess of about 120° C., and continuously during the reaction volatilizing aralkyl halide from the reaction mixture as formed.

11. The method of producing an aralkyl halide which includes reacting dibenzyl ether with hydrogen chloride in the presence of an aqueous solution of a heavy metal halide at a temperature not in excess of about 120° C. and continuously removing benzyl chloride from the reaction as formed.

12. The method of producing an aralkyl halide which includes reacting a di-aralkyl ether with a hydrogen halide in the presence of an aqueous solution of a heavy metal halide containing at least one part by weight of water to one part by weight of heavy metal halide, at a temperature not in excess of about 120° C., and continuously removing aralkyl halide from the reaction as formed.

13. The method of producing an aralkyl halide which includes reacting a di-aralkyl ether with a hydrogen halide in the presence of an aqueous solution of a heavy metal halide containing a ratio of heavy metal halide to water in parts by weight within the range of about 1:1 to about 1:10, at a temperature not in excess of about 120° C., and continuously removing aralkyl halide from the reaction as formed.

14. The method of producing benzyl chloride which includes reacting dibenzyl ether with hydrogen chloride in the presence of an aqueous solution of a heavy metal halide containing at least one part by weight of water to one part by weight of heavy metal halide, at a temperature not in excess of about 120° C., and continuously removing benzyl chloride from the reaction as formed.

15. The method of producing benzyl chloride which includes reacting dibenzyl ether with hydrogen chloride in the presence of an aqueous solution of a heavy metal chloride containing at least one part by weight of water to one part by weight of heavy metal chloride, at a temperature not in excess of about 120° C., and continuously removing benzyl chloride from the reaction as formed.

16. The method of producing benzyl chloride which includes reacting dibenzyl ether with hydrogen chloride in the presence of an aqueous solution of a heavy metal chloride containing a ratio of heavy metal chloride to water in parts by weight within the range of about 1:1 to about 1:10, at a temperature not in excess of about 120° C., and continuously removing benzyl chloride from the reaction as formed.

17. The method of producing benzyl chloride which includes reacting dibenzyl ether with hydrogen chloride in the presence of an aqueous solution of zinc chloride containing a ratio of zinc chloride to water in parts by weight within the range of about 1:1 to about 1:10, at a temperature not in excess of about 120° C., and continuously removing benzyl chloride from the reaction as formed.

HAROLD M. SPURLIN.